Nov. 8, 1932.    C. L. ADAMS    1,887,177
FEED DISTRIBUTOR FOR SETTLING TANKS
Filed March 28, 1930    2 Sheets-Sheet 1

INVENTOR.
Clement L. Adams
BY Lancaster Allwein and Rommel
ATTORNEYS.

Nov. 8, 1932.　　　C. L. ADAMS　　　1,887,177
FEED DISTRIBUTOR FOR SETTLING TANKS
Filed March 28, 1930　　2 Sheets-Sheet 2
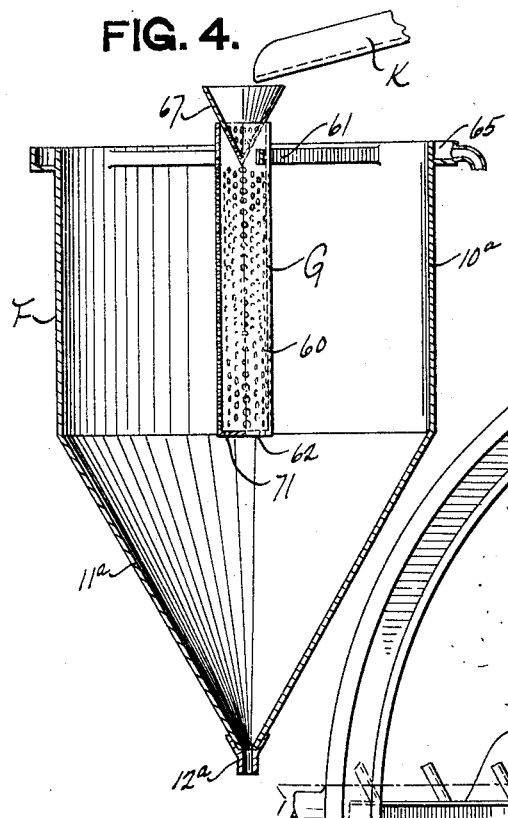
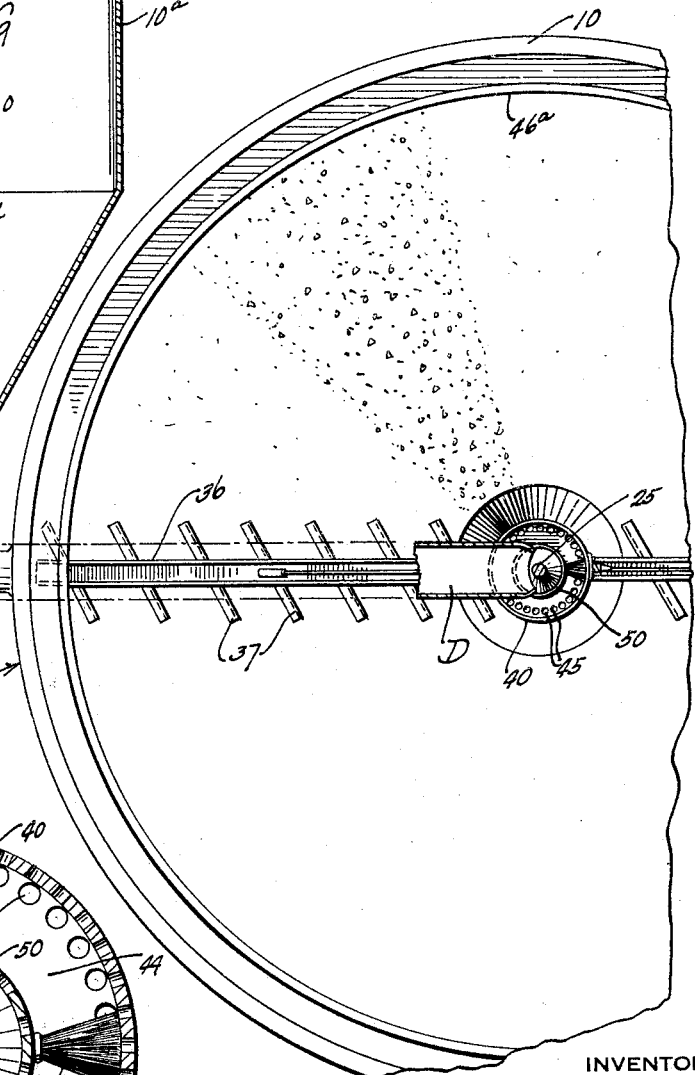
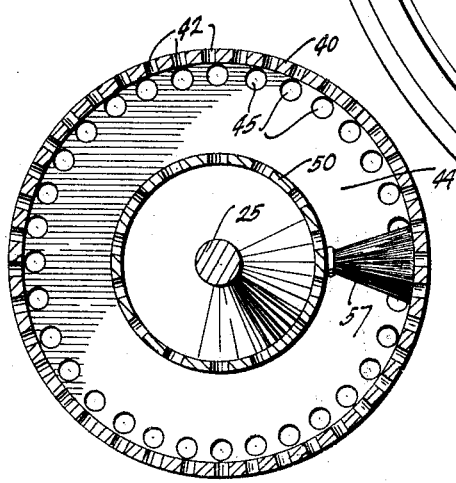
INVENTOR.
Clement L. Adams
BY
ATTORNEYS.

Patented Nov. 8, 1932

1,887,177

UNITED STATES PATENT OFFICE

CLEMENT L. ADAMS, OF GAY, MICHIGAN

FEED DISTRIBUTOR FOR SETTLING TANKS

Application filed March 28, 1930. Serial No. 439,836.

This invention relates to improvements in apparatus for settling solid particles from liquids, and has particular reference to an improved distributor which will cause the liquid to flow in lateral currents in parallelism throughout the major height of a chamber for the purpose of increasing and expediting the efficiency of settlement.

With apparatus in present use for causing settlement of pulp or solids or semi-solids from liquids, it is the practice to so direct the feed of the material into the settling tank that either currents occur within the chamber which will prevent rather than expedite the settlement of the pulp particles, or the distribution of liquids is so limited that there are comparatively quiescent zones in the liquid in the tank without sufficient motivity to permit of a large and uniform rate of settlement. Therefore, the present invention relates to an improved distributor for a settling or receiving tank, which insures the utilization of the entire chamber for uniform settlement, with a substantially horizontal turbulent flow of the feed material through the major height of the chamber, for the efficient and expeditious settlement of foreign solids or particles, and in a manner which will not disturb the particles after settlement from the liquid.

Other objects and advantages of this invention will be apparent during the course of the following detailed description.

In the accompanying drawings, forming a part of this specification, and wherein similar reference characters designate corresponding parts throughout the several views, Figure 1 is a fragmentary vertical sectional view taken diametrically through the improved settling tank, showing the improved feed distributor associated therewith.

Figure 2 is a fragmentary plan view of the distributor within the tank.

Figure 3 is an enlarged horizontal sectional view taken substantially on the line 3—3 of Figure 1.

Figure 4 is a modified settling chamber with an improved type of distributor, of a modified nature, associated therewith.

Figure 1:
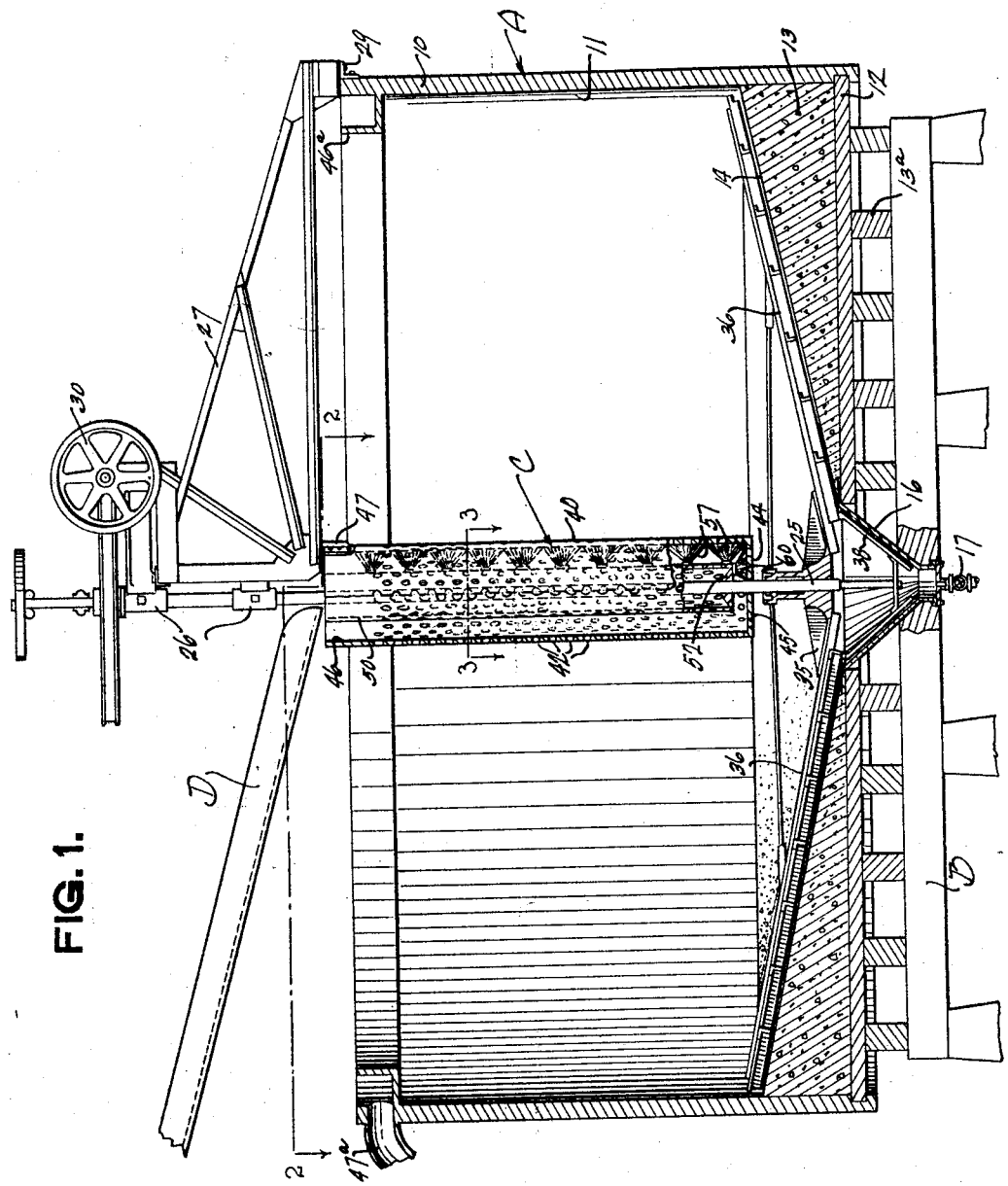

In the drawings, wherein for the purpose of illustration are shown preferred and modified forms of the invention, the letter A may generally designate a preferred type of tank mounted upon a suitable foundation B, having associated therewith distributing means C wherein the liquid material is fed from a launder D. In the modified form of apparatus shown in Figure 4, a tank F is provided having an improved and modified form of distributing means G.

The tank A preferably comprises a cylindrical body 10, which may be of any desired height and diameter, having a chamber 11 wherein the liquid is received. The tank is provided with a suitable bottom 12 resting upon transoms 13ª carried by a foundation B, and the bottom 12 has a stand or concrete bottom layer 13 within the tank, the surface 14 of which slopes from the sides of the tank convergently towards the axis thereof. The bottom of the tank is provided with a discharge cone 16 wherein the pulp is received, and the outlet may be valve controlled at 17, if desired.

The feed distributing means C preferably comprises a vertical shaft 25 supported axially within the chamber or compartment 11; the upper end thereof having bearings 26 in a super-structure frame or supporting truss 27, which may be anchored at 29 upon the top of the tank body 10, or otherwise supported so as to rotatably support the shaft 25 vertically along the axis of the tank A. Means 30 may be provided for rotating the shaft 25 at any desired speed. This means need not be detailed as it is purely conventional.

The shaft 25 extends downwardly axially of the tank A and at its lower end near the bottom of the tank has a spider 35 to which rake arms 36 are connected; the rake arms being oppositely disposed and having blades or teeth 37 disposed thereon in acute angled relation, substantially as shown in Figure 2, for the well known purpose of deflecting the solid particles which have gravitated to the bottom of the tank into the cone 16. If desired a suitable cone scraper 38 may be provided in the cone, substantially after the manner shown in Figure 1.

Vertically in the tank A is disposed a feed distributing well or receptacle 40, which extends throughout the major depth of the chamber 11, projecting at its upper end above the tank A, and extending vertically and axially along the chamber 11, and at its lower end terminating just short of the bottom of the tank, just above the spider 35. This receptacle 40 is preferably of cylindrical formation, although it may be otherwise shaped. It is provided with circumferential courses of openings 42 arranged throughout the height thereof, from the top of the tank body 10 to the bottom wall 44 of the receptacle 40. This bottom wall 44 is preferably provided with a downwardly facing annular series of openings 45 immediately adjacent the outer margin thereof and opening into the compartment 46 within the receptacle 40. The latter is preferably stationary and may be secured at 47 to the stationary frame structure 27, as shown in Figure 1. If used by itself, and the liquid material is discharged from the launder D directly thereinto, the material is passed by reason of head pressure or otherwise radially through the openings 42, discharging in horizontal relation into the tank A. The arrangement of openings 42 insures that the liquid material will be fed into the chamber 11 throughout its major height, without disturbing the gravitated particles which are being discharged into the cone 16, and so as to eliminate the presence of quiescent zones in the body of liquid within the tank and insure a substantially uniform motivated treatment of the material for the purpose of expediting the settlement of the pulp or deposits. Of course, the liquid overflows into a suitable overflow launder 46$^a$ which is provided within the tank at the upper annular margin thereof, and from whence it exits through a suitable conduit 47$^a$ in a manner well known to those skilled in this art.

For the purpose of breaking up heavy currents in the feed of material falling into the distributing launder 40, I may provide a smaller diametered receptacle 50, located within the receptacle 40 and extending from the top thereof to immediately adjacent the bottom wall 44. This receptacle 50 is apertured in circumferential courses vertically therealong in the same manner as the receptacle 40, as shown in Figure 1, and the top of it is open. It is spaced circumferentially from the inner surface of the receptacle 40. The bottom wall 52 is tapered upwardly within the receptacle 50 and is suitably keyed to the shaft 25, so that the said receptacle 50 rotates with the shaft. This receptacle 50 is provided with a vertical series of laterally extending brushes 57 therealong, connected in a suitable tufted arrangement if desired, and engaging the inner walls of the receptacle 40 for the purpose of cleaning therefrom any lint, foreign wood pulp, or other matter tending to blind or obstruct the apertures 42. Merely one vertical series of these brushes or tufts 57 need be provided. A bottom tuft 60 may be provided, to operate over the openings 45 in the bottom wall 44, for the purpose of clearing the same of deposits which will tend to obstruct them.

If desired, the smaller perforated receptacle 50 need not be provided, and the bristles or brush material 57 may be connected directly to the shaft 25.

The launder D feeds the material into the vertical feed receptacle 50; the liquid material filling the receptacle 50 throughout the height thereof, and the same together with suspended particles therein being discharged laterally into the receptacle 40, and thence through the openings 42 in the horizontal relation above mentioned, into the chamber 11 within the body of liquid therein; the particles as they travel horizontally gravitating towards the bottom of the chamber 11 in a manner which is perfectly apparent.

In the type of tank F shown in Figure 4, there is provided a cylindrical portion 10$^a$, having a conical bottom 11$^a$ abruptly sloping downwardly and terminating at a discharge outlet 12$^a$ arranged axially of the tank 10$^a$ at a very considerable distance below the bottom of the cylindrical or uniform diametered portion 10$^a$. The distributing means G preferably comprises an elongated perforated receptacle 60, suitably supported by arms or other means 61 axially within the tank F, and extending from above the top of the tank body 10$^a$ to adjacent the juncture of the sloping bottom 11$^a$ therewith. This receptacle 60 may be of cylindrical formation, and it is perforated with small apertures throughout the height thereof from the bottom wall 62 upwardly to adjacent the top of the body 10$^a$, so as to afford a uniform and horizontal distribution of the liquid into the body 10$^a$ of the tank, throughout the entire or major height thereof. Of course, the particles precipitating from the liquid drop rapidly by gravity over the sloping bottom 11$^a$ and no rake means is necessitated to cause the feed thereof to the discharge 12$^a$. An overflow launder 65 is provided, and it is of conventional construction. A funnel type concentrating feed 67 is supported in the upper end of the receptacle 60, having walls sloping convergently downward to a point axially of the receptacle 60; the lower end thereof which is within the upper end of the receptacle 60 preferably being perforated. This funnel-shaped screen device is provided to break the force of liquid as it falls into the distributor from the feed launder K, shown in Figure 4. If desired, the openings 45 in the bottom of the distributing receptacle 40 may be larger than the openings 42, although it is thought that by having openings of the same size throughout the distributing means, uniform velocity of flow will result, which is a thing to be desired. It is to be noted that the bottom 52 of the type of distributor 60 is also provided with openings 71 thereabout.

Characteristic solid or semi-solid or pulp particles in suspension in a liquid of known viscosity will settle at a definite rate. Therefore, to obtain better, more uniform, and expeditious settling of the pulp, or particles within a tank, the velocity of the horizontal flow of liquid in the tank must be reduced to an extent consistent with other characteristics and conditions. This is efficiently accomplished in the present invention by utilizing the entire depth of the tank compartment for horizontal flow of the liquid material, and not merely a small central or upper portion thereof.

Various changes in the shape, size, and arrangement of parts may be made to the forms of invention herein shown and described, without departing from the spirit of the invention or the scope of the claims.

I claim:

1. In a feed distributing device for settling tanks the combination of a settling tank, a vertical distributing receptacle centrally mounted in the tank having lateral discharge apertures opening into the tank throughout the major height of the tank compartment, and means for initially feeding liquid material into the distributing receptacle throughout the major height thereof in a non-eddy producing relation, said means carried at the upper end of the receptacle comprising a conical concentrating feed having an upper open end and a pointed and perforated lower end projecting into the receptacle.

2. In a feed distributing device for settling tanks the combination of a settling tank, a vertical distributing receptacle centrally mounted in the tank having lateral discharge apertures opening into the tank throughout the major height of the tank compartment, and cleaning means operating on the interior of the distributing receptacle for preventing obstruction of the apertures therein.

3. In apparatus of the class described the combination of a tank having surrounding body walls and a bottom, means for discharging material from the bottom of the tank, a liquid feed distributor centrally in the tank comprising an elongated receptacle extending throughout the major height of the tank having lateral discharge openings therein, and brush cleaning means rotatably operating across said openings of the elongated distributing receptacle.

4. In apparatus of the class described the combination of a tank having surrounding body walls and a bottom, means for discharging material from the bottom of the tank, a liquid feed distributor centrally in the tank comprising an elongated receptacle extending throughout the major height of the tank having lateral discharge openings therein, brush cleaning means rotatably operating across said openings of the elongated distributing receptacle, and deposit removing means operating on the bottom of the tank and operatively connected with the cleaning means, for rotation therewith.

5. In apparatus of the class described the combination of a settlement tank having deposit removing means in the lower end thereof and a liquid overflow launder at the top thereof, liquid distributing means vertically mounted centrally in the tank comprising inner and outer relatively spaced perforated elongated receptacles, and means for feeding liquid into the inner receptacle from the top thereof.

6. In apparatus of the class described the combination of a settlement tank having deposit removing means in the lower end thereof and a liquid overflow launder at the top thereof, liquid distributing means vertically mounted centrally in the tank comprising inner and outer relatively spaced perforated elongated receptacles, means for feeding liquid into the inner receptacle from the top thereof, said receptacles each extending throughout the major height of the tank and being perforated therealong with small openings throughout the major height thereof.

CLEMENT L. ADAMS.